April 28, 1959     M. J. PATRICK     2,884,046
COLLAPSIBLE BABY STROLLER AND WALKER
Filed Nov. 4, 1953     4 Sheets-Sheet 1

INVENTOR.
MERLYN J. PATRICK
BY
HIS ATTORNEY

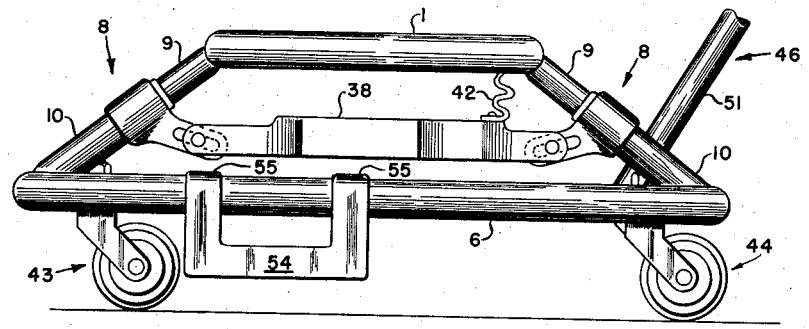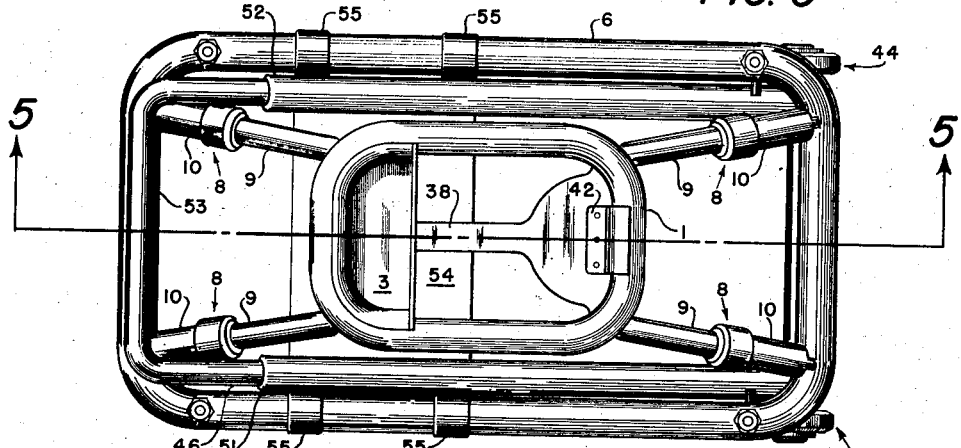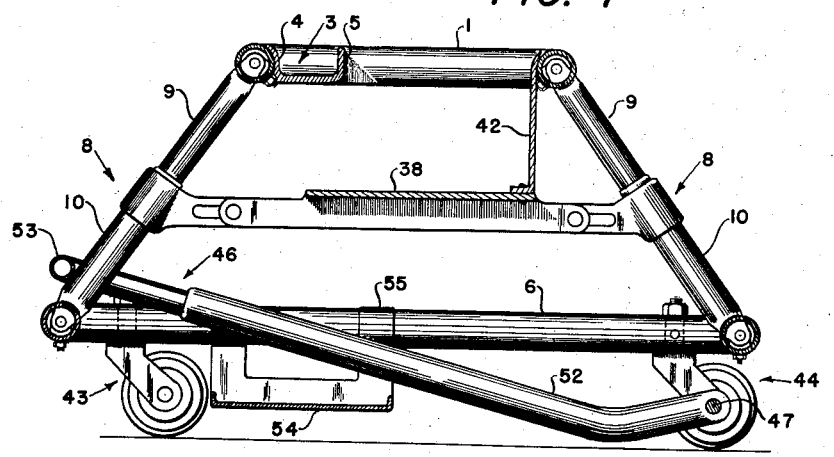

April 28, 1959
M. J. PATRICK
2,884,046
COLLAPSIBLE BABY STROLLER AND WALKER
Filed Nov. 4, 1953
4 Sheets-Sheet 3
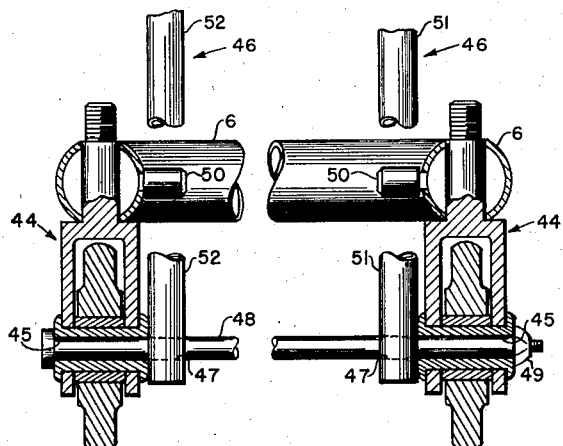
FIG. 8
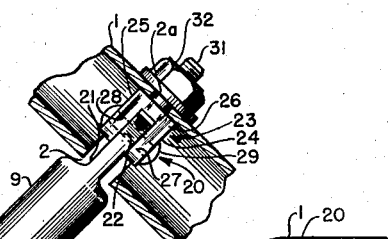
FIG. 6
FIG. 7
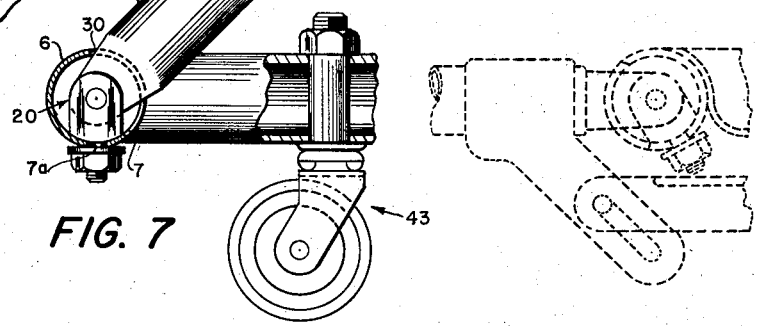
INVENTOR.
MERLYN J. PATRICK
BY
Stanley J Price
HIS ATTORNEY April 28, 1959 M. J. PATRICK 2,884,046
COLLAPSIBLE BABY STROLLER AND WALKER
Filed Nov. 4, 1953 4 Sheets-Sheet 4

INVENTOR.
MERLYN J. PATRICK
BY
*Stanley J. Price*
HIS ATTORNEY

United States Patent Office 2,884,046
Patented Apr. 28, 1959

2,884,046

COLLAPSIBLE BABY STROLLER AND WALKER

Merlyn J. Patrick, Pittsburgh, Pa., assignor of fifty percent to Francis J. Boeh, Pittsburgh, Pa.

Application November 4, 1953, Serial No. 390,169

8 Claims. (Cl. 155—22)

This invention relates to a combination baby walker and stroller and more particularly to a baby stroller that is collapsible and easily transported or stored when not in use.

An object of this invention is to provide a baby stroller that is collapsible from its upright position into a telescoped position and easily assembled into an upright position from its collapsed or telescoped position.

Another object of this invention is to provide a baby stroller with a collapsible handle that either folds within the periphery of the stroller or may be detached to provide a baby walker.

Another object of this invention is to provide a stroller that is simple in construction, easily assembled and extremely light and portable.

Other objects of this invention will be apparent from the following description, the drawings to which it relates and the claims hereinafter set forth.

This invention comprises a new and novel construction and combination of parts and their operating relation to each other which will be more fully described hereinafter and the novelty of which will be particularly pointed out and distinctly claimed.

In the accompanying drawings to be taken as part of this specification there is fully and clearly illustrated preferred embodiments of this invention in which drawings;

Figure 3 is a view in elevation showing the stroller in a partially collapsed position.

Figure 4 is a plan view of the stroller with its handle telescoped and folded.

Figure 5 is a view in section taken along the lines 5—5 in Figure 4.

Figure 6 is a view of a strut member showing the upper and lower tubular frame members in section and the tubular strut members in partial section illustrating the strut locking mechanism and the strut securing mechanism.

Figure 7 is a fragmentary view in elevation of the seat supporting member secured to the strut member and illustrating the rotation of the strut member when the stroller is moved from its expanded position to its collapsed position.

Figure 8 is a view in section taken showing the handle attaching means and the removable rod.

Figure 1:
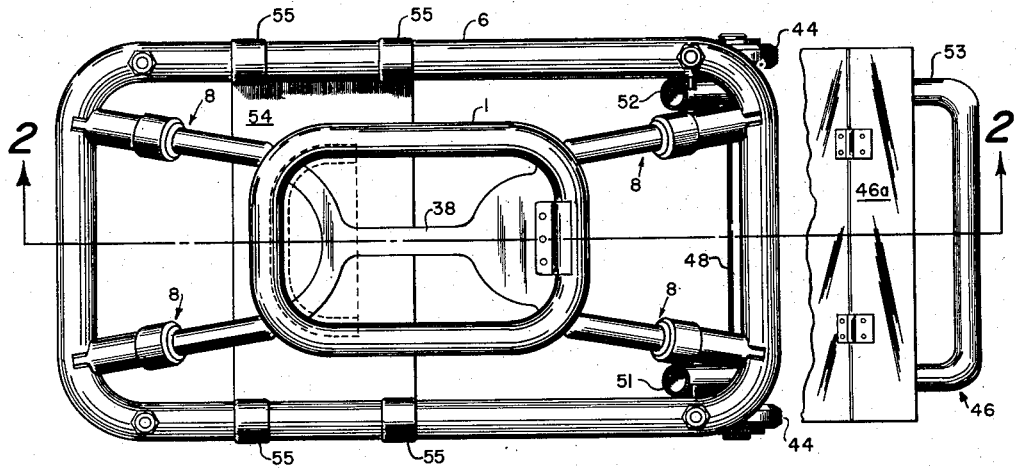
Figure 1 is a plan view of the stroller showing the collapsible handle in its extended position.

Referring to the drawings by numerals of reference and more particularly to Figures 1, 2, 6 and 7 there is shown a baby stroller having an upper tubular frame member 1 that is generally rectangular in shape and having symmetrically rounded corners. The upper tubular frame member 1 has a plurality of apertures 2 and 2a. A tray 3 having rounded flanged portion 4 and a flanged portion 5 is secured to the upper tubular frame member 1 by means of the flanged portion 4. A lower tubular frame member 6 is positioned parallel to the upper tubular frame member 1 and is also generally rectangular in shape with symmetrically rounded corners. The lower tubular frame member 6 is of a larger sizes than the upper tubular frame member 1 and is capable of receiving the upper tubular frame member 1 within its periphery when the stroller is in its collapsed or folded position. The lower tubular frame member 6 has a plurality of apertures 7 and 7a therein. The upper tubular frame member 1 is secured to the lower tubular frame member 6 in parallel relation by means of a plurality of strut members 8. The strut members 8 having an upper tubular portion 9 and a lower tubular portion 10.

As shown in detail in Figure 6 the upper tubular strut member 9 has an outer diameter smaller than the inner diameter of the lower tubular strut member 10 and the upper tubular member 9 is inserted into the lower tubular strut member 10 and is capable of telescoping therein. The tubular strut members 9 and 10 are locked in an upright position by means of a clip type locking device 11. The upper strut member 9 has a clip securing aperture 12 therein and a clip type lock release aperture 13. The lower tubular strut member 10 has a clip lock release aperture 14.

The clip type locking device 11 has a J shaped resilient clip member 15 having a securing aperture 16 and a lock actuator aperture 17. The J shaped resilient clip member 15 is inserted into the inner portion of the upper tubular strut member 9 and is secured in position as shown in Figure 6 by a rivet 18 or any other suitable securing means. A locking actuator arm 19 is secured in the aperture 17 of the J shaped resilient clip member 15 and passes through aperture 13 in the upper tubular strut member 9 and through aperture 14 in the lower tubular strut member 10. Thus the locking actuator 19 holds the upper tubular strut member 9 and the lower tubular strut member 10 in an expanded position.

When the locking actuator arm 19 is depressed beyond the aperture 14 in the lower tubular strut member 10 and pressure is exerted on the upper tubular strut member 9, the upper tubular strut member 9 will telescope within the lower tubular strut member 10 and the locking actuator arm 19 will exert a force against the inner wall of the lower tubular strut member 10 due to the resiliency of the J shaped resilient clip member 15. When the upper tubular strut member 9 is moved to an upright position the locking actuator arm 19 will again pass through the aperture 14 in the lower tubular strut member 10 and lock the strut member 8 in its upright or expanded position.

The upper tubular strut member 9 is secured to the upper tubular frame member 1 and the lower tubular strut member 10 is secured to the lower tubular frame member 6 by a hinge type securing mechanism 20 shown in detail in Figures 6 and 7. The description of the hinge securing means will be confined to the upper tubular strut member 9, however, it is to be understood that the lower tubular strut member 10 is secured in a similar manner and will have the same numerals of reference whenever the structure is similar.

The upper tubular strut member 9 has a pinched or crimped end portion 21 with an aperture 22 therethrough. A U shaped connecting member 23 has arm portions 24 and 25 and a body portion 26. The arm portions 24 and 25 have apertures 27 and 28 therethrough. The apertures 27 and 28 are aligned with each other and with aperture 22 in the crimped portion 21 of the upper tubular strut member 9. Pin or rivet 29 passes through apertures 27, 22 and 28 and rotatably secures the upper strut member 9 to the U shaped connecting member 23.

The apertures 2 in the upper tubular frame member 1 each have a slotted portion 30 (Figure 7) through which the crimped portion 21 of the upper tubular strut member 9 extends. A threaded bolt 31 is secured to the outer side of the body portion 26 of the U shaped connecting member 23 and passes through the aperture 2a in the upper tubular frame member 1. A nut 32 is threaded on the bolt 31 and secures the U shaped connecting member 23 to the upper tubular frame member 1. Thus the upper tubular strut member 9 is rotatably secured to the upper tubular frame member 1. The lower tubular strut member 10 is similarly secured to the lower tubular frame member 6.

A plurality of seat supporting members 33 having a tubular portion 34 and an ear portion 35 are secured to the lower tubular strut member 10 by means of the tubular portion 34 being welded or otherwise suitably secured to the outer surface of the lower tubular strut member 10. The tubular portion 34 is positioned on the lower tubular strut member 10 adjacent the locking actuator 19 whereby the tubular portion 34 does not interfere with the operation of the clip type locking device 11. The ear portion 35 has a seat retainer slot 36 therein.

A seat 37 having a top flat portion 38 suitably shaped to support a child in a straddling position and flanged edge portions 39 is positioned parallel to the upper and lower tubular frame members 1 and 6. The flanged portions 39 have seat securing apertures 40 therein. The seat 37 is so positioned that the seat securing apertures 40 are aligned with their respective seat retainer slots 36 in the seat supporting members 33. Pins or rivets 41 loosely secure the seat 37 to the seat supporting members 33. Thus when the lower tubular strut member 10 is rotated toward its collapsed position the seat member 37 will remain parallel with the lower tubular frame member 6 and the seat securing pins 41 will slide in the slots 36. A flexible pad 42 is positioned over the top portion of the seat 37 and extends upward to the upper tubular frame member 1 to form a flexible back rest which will not interfere with the collapsing of the stroller.

A pair of caster type wheels 43 are secured to the front end of the stroller by means of a conventional securing means. A second pair of caster wheels 44 are secured to the rear portion of the stroller by a suitable securing means. As shown in Figure 8, the axle of the rear caster wheels 44 has an aperture 45 therethrough. A collapsible handle 46 having a pair of aligned apertures 47 is secured to the stroller by means of a rod 48 passing through the apertures 47 in the handle 46 and through the apertures 45 in the axles of the rear wheels 44. The rod 48 is threaded at one end and retained in its operative position by means of a conventional nut 49. A pair of stop members 50 are secured to the inner portion of the lower tubular frame member 6 to prevent the clockwise rotation of the handle 46 beyond a predetermined position. The handle 46 may be removed by the removal of the rod 48 and the rear caster wheels 44 are again permitted to rotate and caster freely. The handle 46 has two tubular arm portions 51 and 52 and a U shaped tubular grip portion 53. The grip portion 53 is of tubular construction with its outer diameter being smaller than the inner diameter of the arm portions 51 and 52. A locking device similar to the clip type locking device 11 heretofore described locks the grip portion 53 in its expanded position. To telescope and fold the handle 46 the locking devices, not shown, are depressed and the gripping portion 53 is telescoped within the arm portions 51 and 52 and is rotated counter-clockwise until the gripping portion 53 rests against the lower tubular frame member 6 as shown in Figure 4. It should be noted that in the folded and collapsed position the handle 46 does not extend past the lower extremity of the rear caster wheels or the front of the lower tubular frame member 6.

A foot rest 54 is secured to the lower tubular frame member 6 by means of the bevelled ear portions 55. The foot rest 54 may be readily removed by lifting the foot rest 54 until the ear portions 55 are clear of the lower frame member 6. Thus to convert the stroller into a baby walker the rod 48, the handle 46 and the foot rest 54 are removed. The rear wheels will then caster freely and the stroller will serve as a baby walker. A combination carrying case and grocery carrier 46a is secured to the handle 46 by a suitable means.

Operation

Figure 2:
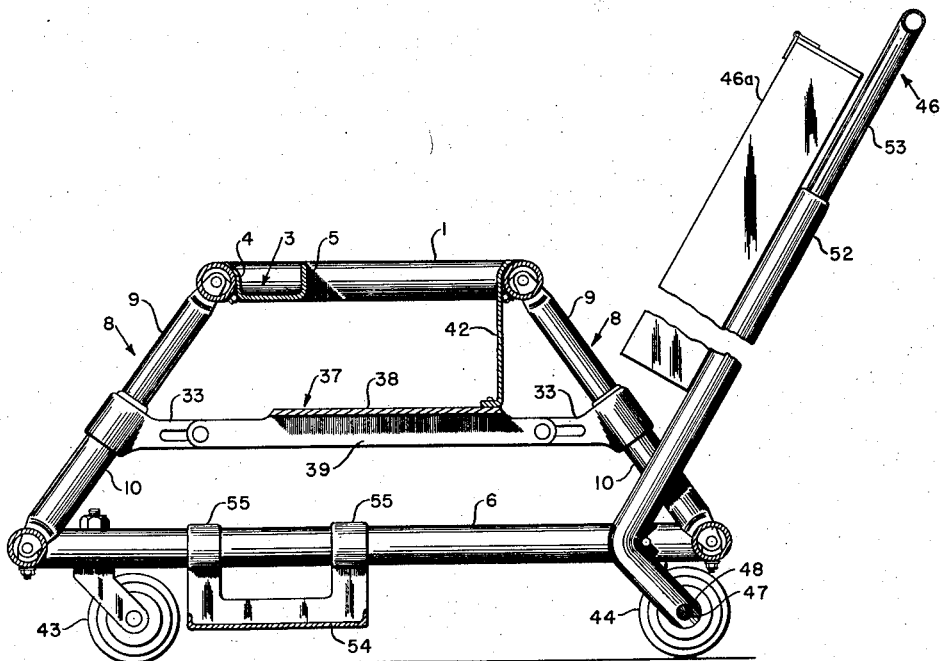
Figure 2 is a view in section taken along the lines 2—2 in Figure 1.

The device heretofore described operates as follows: When in the upright or expanded position as shown in Figures 1 and 2 the stroller is ready for use. In this upright position the center of gravity of the stroller is located in its geometrical center which provides a sturdy mechanism that will not tip or will not tend to overturn when an infant is placed in the stroller. To convert the stroller into a baby walker the rod 48 is removed from the aperture 45 in the rear axles of the caster wheels 44 which permits the rear wheels to rotate and caster freely. The removal of the rod 48 will disconnect the handle 46 and permit the stroller to be used as a baby walker. The foot rest 54 is then removed as heretofore described.

To collapse the baby walker or stroller for storage the locking actuator 19 on all four of the tubular strut members 8 are depressed and the upper tubular strut members 9 are permitted to telescope within the lower tubular strut members 10. In collapsing the stroller the hinge type securing means 20 acts as the pivot point about which the various parts of the stroller collapse inwardly. The proportionate diminishing of the size of the tubular strut members 8 while the stroller is being collapsed permits the upper tubular frame member 1 and the seat 37 to remain parallel with the lower tubular frame member 6. This is shown in Figure 3 where the stroller is in a partially collapsed position. The tubular frame members and the tubular strut members are so proportioned that when the upper tubular strut members 9 are completely telescoped within the lower tubular strut members 10 and the upper tubular frame member will be positioned within the periphery of the lower tubular frame member 6 and form a small compact unit that may be conveniently stored in its own carrying case 46a. The vertical dimension of the stroller in its collapsed position being the dimension of the caster wheel assemblies. To expand the stroller from its collapsed position, the upper tubular frame member 1 is moved in a vertical direction away from the lower tubular frame member 6 until the actuator 19 locks in the aperture 14 of the lower strut member 10. It should be noted that the hinge type connecting means 20 permits the various members to rotate freely and the hinge or point of rotation is positioned within the tubular frame members.

Figure 10:
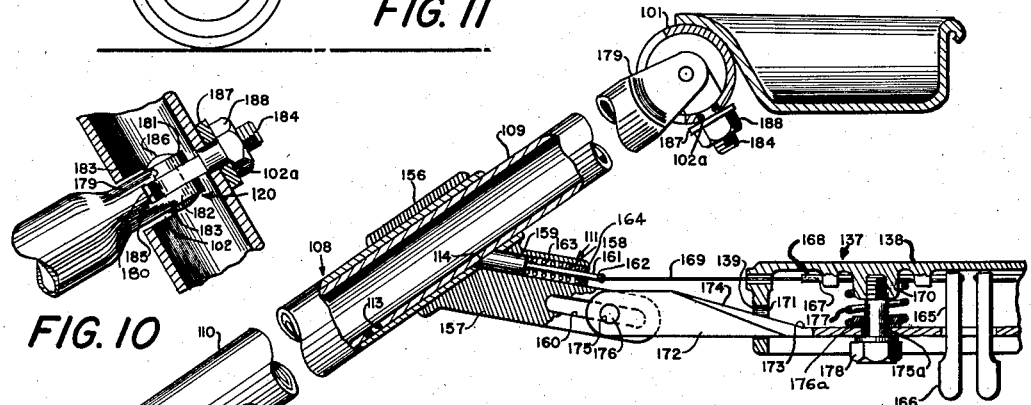
Figure 10 is a view in partial section showing another embodiment of the hinge securing means between the tubular strut members and the tubular frame members.
Figure 9:
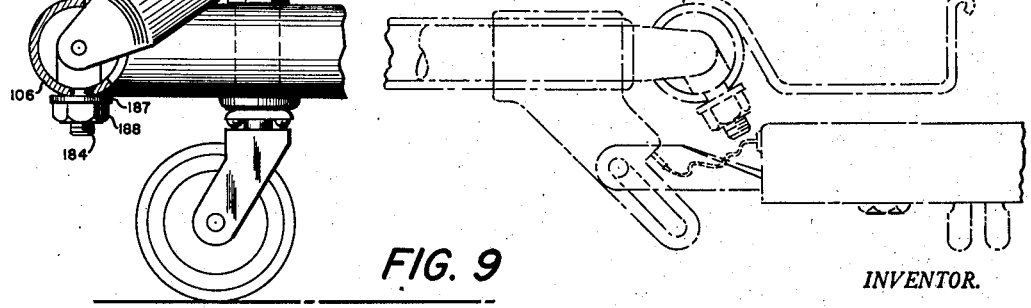
Figure 9 is a fragmentary sectional view in elevation of another embodiment of my invention showing in partial section a combination strut locking mechanism and seat supporting member. This embodiment of my invention is shown in extended position in full line and in its collapsed position in dotted lines.

Another form of this invention is shown in Figures 9 and 10 and all the structure that is similar to the structure heretofore described will be given the same numeral with the addition of the numeral 100.

The upper tubular frame member 101 and the lower tubular frame member 106 are similar in size and shape to the tubular members 1 and 6 heretofore described.

The tubular members 101 and 106 are positioned parallel to each other and are supported by a plurality of struts 108. The struts 108 have an upper tubular strut member 109 and a lower tubular strut member 110 that telescope in the same manner as the struts 9 and 10. The tubular members 109 and 110 are locked in an upright or expanded position by means of a locking device 111. The locking device 111 has a tubular portion 156 and an arm portion 157. The tubular portion 156 is secured around the upper end of the lower tubular strut 110. The locking device 111 is so positioned that the arm portion 157 will extend inwardly toward the center of the stroller.

The arm portion 157 has an aperture 158 parallel to its longitudinal axis in which is positioned a rod 159. The arm portion 157 has a slot portion 160 that is parallel to and below said aperture 158. The rod 159 has a portion of reduced diameter 161 extending therefrom with an aperture 162 perpendicular to its longitudinal axis. The rod 159 extends through the aperture 114 in the lower tubular strut member 110 and through the aperture 113 in the upper tubular strut member 109 to lock the tubular strut members 109 and 110 in an upright or expanded position. The rod 159 is urged toward the locking position by means of a spring 163 that is positioned over the portion 161 and within the aperture 158. The spring is held in position by means of an annular plug member 164 that is secured in the aperture 158. Thus the rod member 159 is movable within the aperture 158 and is biased toward a strut locking position by means of the spring 163.

A release arm 165 having a handle portion 166 and an operating portion 167 is movably secured to the bottom of the seat 137 by a plurality of tubular securing members 168. The operating portion 167 is connected to the rod member 159 by means of a flexible wire 169. The wire 169 is secured to the rod 159 through the aperture 162 and to the release arms 165 by means of a weld or any other conventional means. It should be understood that the locking device 111 is arranged and positioned relative to the strut members 108 in the same manner as heretofore described in the other type of stroller.

The seat member 137 has a top flat portion 138 and a flanged side portion 139. The under side of the top portion 138 has a plurality of internally threaded portions 170 depending therefrom. The flanged side portions 139 have slotted portions 171. A seat securing member 172 has a flat seat securing base 173 and flanged sides 174. The flanged sides 174 have aligned apertures 175 therethrough. The seat securing base 173 has an aperture 175a therethrough. The seat securing member 172 has its base portion 173 extend through the slots 171 in the seat 139 and the apertures 175 of the flanged portions are aligned with the slot 160 in the locking device 111. A rivet or bolt 176 is positioned through the apertures 175 and the slot 160 thus rotatably securing the seat securing member 172 to the locking device 111.

A spring 177 is positioned around the internally threaded depending portion 170 and extends downwardly and abuts a washer 176a. The aperture 175a in the seat securing member base portion 173 is aligned with the internally threaded depending portion 170. A bolt 178 passes through the aperture and is threadedly secured in the internally threaded depending portion 170. The spring 177 exerts a resilient force against the base portion 173 of the seat supporting member 172. In this manner the seat 137 is secured to the locking device 111 and the spring 177 will give the seat a cushioned type of movement since any force that is exerted on the seat 137 will be resisted by the resilient force of the spring 177. The spring 177 is so designed that it will compress slightly when the occupant of the stroller is seated therein. Thus there will be a spring type cushion between the struts 108 of the stroller and the seat. With this type of arrangement the occupant will not receive the jarring movement when the stroller passes over uneven surfaces because of this spring type construction.

The tubular strut members 109 and 110 are secured to their respective tubular frame members 101 and 106 by means of a hinge type securing member 120 (Figure 10). The tubular strut member 109 has a flattened end 179. The end 179 has a slot 180 therein thus forming a U shaped flattened end portion having side walls 181 and 182. The side walls 181 and 182 have aligned apertures 183 therethrough. A bolt 184 having an eyed end portion 185 is positioned with the eyed portion 185 within the slot 180 of the end portion 179. The eyed portion 185 is aligned with the apertures 183 in the side walls 181 and 182 with a rivet 186 extending therethrough. Thus the tubular strut member 109 is hingedly secured to the bolt member 184. The flattened end portion 179 is inserted in the aperture 102 in the upper tubular frame member 101 and the bolt 184 passes through the aperture 102a in the upper tubular frame member 101. A washer 187 is positioned on bolt 184 which is threadedly secured to the upper tubular frame member 101 by a nut 188.

It should be noted that although the hinge structure 120 has been described to secure the upper tubular strut member 109 to the upper tubular frame member 101, the lower tubular strut member 110 is similarly secured to the lower tubular frame member 106.

Operation

The operation of the device shown in this embodiment is similar to that shown in the previous embodiment with the additional advantage that the stroller may be released from its upright position by operation of the release arms 165. In this embodiment the combination seat supporting member and locking device 111 may be secured on two oppositely positioned tubular strut members 108 or may be positioned on all four tubular strut members. To release this type of locking device the release arms 165 are moved toward each other therefore simultaneously releasing the locking members 111. It should be noted in this embodiment that the seat member 137 is supported by a plurality of springs that will exert a cushioning effect.

Figure 11:
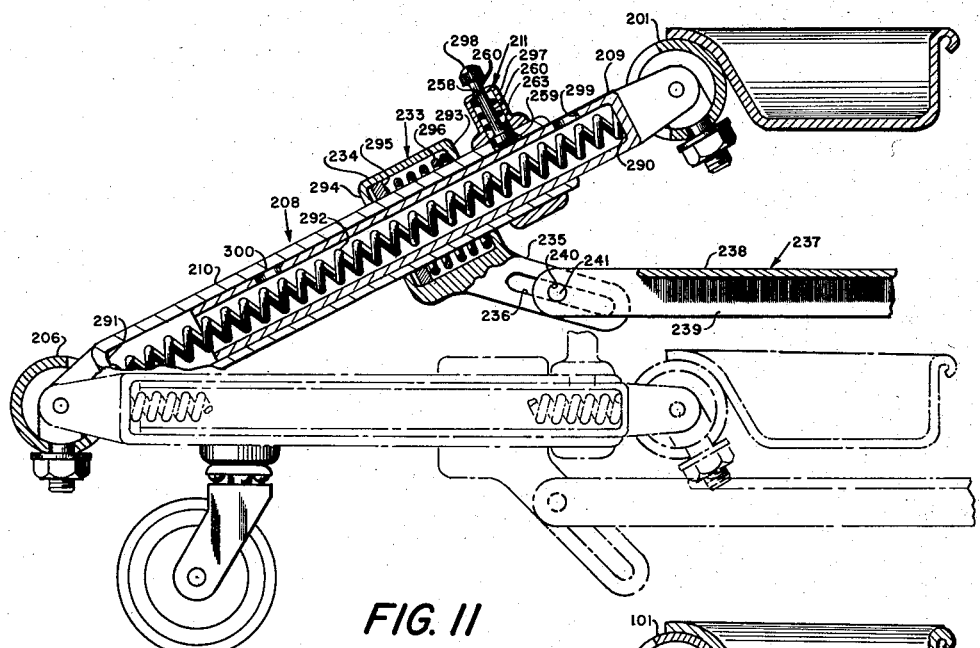
Figure 11 is a fragmentary sectional view in elevation of another embodiment of my invention. This embodiment is shown in its extended position in full lines and in its collapsed or telescoped position in dotted lines.

Another embodiment of this invention is shown in Figure 11 and all structure that is similar to the structure heretofore described will be given the same numerals with the addition of the numeral 200.

The upper tubular frame member 201 and the lower tubular frame member 206 are similar in size and shape to the tubular members 1 and 6 heretofore described. Tubular frame members 201 and 206 are positioned parallel to each other and are supported by a plurality of struts 208. The struts 208 having an upper tubular strut member 209 and a lower tubular strut member 210 that telescope in the same manner as the struts 9 and 10. The tubular strut member 209 has a closed end portion 290. The lower tubular strut member 210 has a closed end portion 291. A coil type spring 292 is positioned within the tubular strut members 209 and 210 and abuts the end portions 290 and 291 respectively. The spring 292 exerts a force against the end portions 290 and 291 which tends to expand the telescoped tubular strut members 209 and 210. The tubular strut members 209 and 210 are locked in their expanded and telescoped positions by means of a locking device 211.

A seat supporting structure 233 having a tubular portion 234 and an arm portion 235 is positioned with its tubular portion 234 around the lower tubular strut member 210. The tubular portion 234 has inwardly flanged end walls 293 and 294 which are slideably positioned adjacent the tubular strut member 210. An annular ring member 295 is secured to the lower tubular frame member 210 within the tubular portion 234 of the seat supporting member 233. A coil spring 296 is positioned around the lower tubular strut member 210 and abuts at one end the annular ring 295 and at its other end the end wall 293. The tubular portion 234 of the seat supporting member 233 is retained in position against the force of the spring 296 by inwardly flanged end wall 294 abutting against the annular ring 295.

The arm portion 235 of the seat supporting member 233 has a slotted portion 236. A seat member 237 having flanged side wall 239 is positioned parallel to the upper and lower frame members 201 and 206. The flanged side wall 239 of the seat member 237 has a plurality of seat securing apertures 240. The seat securing apertures 240 are aligned with the slot 236. A pin or rivet 241 is positioned in the apertures 240 and the slot 236 to secure the seat member 237 to the seat supporting members 233. Thus the seat 237 is secured to the seat supporting members 233 and the spring 296 will give the seat a cushioned type of movement since any downward force that is exerted on the seat will be resisted by the resilient force of the spring 296.

The locking device 211 has a body member 297 that is secured to the lower tubular strut member 210. The body member 297 has a passageway 258 therethrough. A locking rod 259 having a portion of reduced diameter 260 and knob portion 298 is positioned in the passageway 258 with the knob extending beyond the body member 297. A spring 263 is positioned around the portion of reduced diameter 260 within the passageway 258. The spring 263 abuts the inner wall of the body member 297 and the rod 259 thus exerting a force against the rod 259.

The upper tubular member 209 has an aperture 299 in its sidewall adjacent the closed end portion 290 and another aperture 300 adjacent its open end. When the stroller is in a collapsed position the aperture 299 is aligned with the rod 259 of the locking device 211. Due to the resilient force of the spring 263 the rod 259 will automatically seat in the aperture 299 when aligned with the aperture 299. The spring 292 within the tubular members 209 and 210 will be compressed when the stroller is in its collapsed position and will tend to expand the telescoped struts 209 and 210. However, the rod 259 of the locking device 211 is positioned within the aperture 299 of the upper tubular strut member 209 and locks the stroller in its collapsed position.

To release the stroller from its collapsed position the knob 298 is pulled against the force of the spring 263 and the rod 259 is moved out of the aperture 299 in the upper tubular strut member 209. The force of the spring 292 will thus expand the stroller to its upright position. When the upper tubular strut member 209 moves away from the lower tubular strut member 210 the aperture 300 in the upper tubular strut member 209 will align with the rod 259 of the locking device 211. The spring 263 exerts a force against the rod 259 which will permit the rod 259 to enter the aperture 300 and lock the stroller in its upright position. Thus the locking device 211 locks the upper tubular member 209 in both its expanded and collapsed position by means of the rod 259 passing through the apertures 300 or 299 respectively.

*Operation*

Additionally this embodiment contains a spring secured within each tubular strut members 208 that urges each of the tubular strut members 208 toward an expanded position and when the stroller is in a collapsed position the rod 259 extends through the aperture 299 in the upper tubular strut member 209. To release the stroller from its collapsed position the knob portion 298 of the rod 259 is moved against the spring 263 and the rod 259 will move out of the aperture 299 in the upper tubular strut members 209. The force of the spring 292 will expand the tubular strut members 208 into an upright position where the rod 259 will position itself in the aperture 300 of the upper tubular strut members 209 and lock the stroller in an upright position. It should also be noted in this embodiment that the seat member 237 is supported on another type of spring cushioning means.

While there has been described only several embodiments of this invention it will be obvious to those skilled in the art that other embodiments are possible which are the equivalent of this invention without departing from the scope of this invention as defined in the appended claims.

Having thus described the invention, what is claimed and is desired to be secured by Letters Patent of the United States is:

1. In a stroller an upper tubular frame member, a lower tubular frame member, a plurality of tubular strut members hingedly secured at one end to said upper frame member and at the other end to said lower frame member, each of said struts having an upper tubular member and a lower tubular member, one of said tubular members of each of said struts being positioned within the other of said tubular members and slidable therein to permit one of said tubular members to telescope within said other tubular member to collapse said stroller and lower said upper frame member within the periphery of said lower frame member, means to lock said upper and lower tubular members in an extended position, seat supporting portions extending inwardly from certain of said tubular strut members, a seat member slidably secured to said seat supporting portions and extending in parallel relation to and between said upper and lower frame members, said seat supporting portions arranged to maintain said seat member in substantially parallel relation to said frame members irrespective of the relative position of said frame members to each other, and a plurality of wheels secured to said lower frame member.

2. In a stroller, an upper tubular frame member, a lower tubular frame member, a plurality of tubular struts hingedly secured at one end to said upper tubular frame member and at the other end to said lower tubular frame member, each of said struts having an upper tubular member and a lower tubular member, said upper tubular member being positioned within said lower tubular member and slideable therein to permit said upper tubular member to telescope within said lower tubular member to collapse said stroller and lower said upper frame member within the periphery of said lower frame member, a plurality of said upper and lower tubular strut members having aligned locking apertures therethrough, means to lock said stroller in an upright position, said means comprising a pin extending through said locking apertures, spring means positioned within said upper tubular member and secured to said locking pin biasing said locking pin toward locked position, seat supporting portions extending inwardly from certain of said tubular strut members, a seat member slideably secured to said seat supporting portions and extending in parallel relation to and between said upper and lower frame members, said seat supporting portions arranged to maintain said seat member in substantially parallel relation to said frame members irrespective of the relative position of said frame members to each other, and a plurality of wheels secured to said lower frame member.

3. In a stroller, an upper tubular frame member, a lower tubular frame member, a plurality of tubular struts hingedly secured at one end to said upper tubular frame member and at the other end to said lower tubular frame member, each of said struts having an upper tubular member and a lower tubular member, said upper tubular member being positioned within said lower tubular member and slideable therein to permit said upper tubular member to telescope within said lower tubular member to collapse said stroller and lower said upper tubular frame member within the periphery of said lower tubular frame member, a plurality of said upper and lower tubular strut members having aligned locking apertures therethrough, means to lock said stroller in an upright position, said means comprising a plurality of locking members, each having a tubular portion and an arm portion extending from said tubular portion, said tubular portions of said members being positioned over and secured to the outer walls of said respective lower tubular members, said arm portion having an aperture parallel to its longitudinal axis and opening into said tubular portion, said aperture being aligned with said locking apertures in said upper and lower members, a rod positioned in said arm portion aperture and extending through said locking apertures in said upper and lower tubular strut members, means to bias said rod towards said locking member tubular portion, means to move said rod away from said locking member tubular portion, said locking member arm portions including seat supporting portions, a seat member slidably secured to said seat supporting portions and extending in parallel relation to and between said upper and lower frame members, said seat supporting portions arranged to maintain said seat member in substantially parallel relation to said frame members irrespective of the relative position of said frame members to each other, and a plurality of wheels secured to said lower frame member.

4. In a stroller, an upper tubular frame member, a lower tubular frame member, a plurality of tubular struts hingedly secured at one end to said upper tubular frame member and at the other end to said lower tubular frame member, each of said struts having an upper tubular member and a lower tubular member, said upper tubular member being positioned within said lower tubular member and slidable therein to permit said upper tubular member to telescope within said lower tubular strut member to collapse said stroller and lower said upper tubular frame member within the periphery of said lower frame member, spring means positioned within said tubular strut members to bias said struts toward an expanded position, means to lock said upper and lower tubular members in a collapsed position and in an expanded position, seat supporting portions extending inwardly from certain of said tubular strut members, a seat member slidably secured to said seat supporting portions and extending in parallel relation to and between said upper and lower frame members, said seat supporting portions arranged to maintain said seat member in substantially parallel relation to said frame members irrespective of the relative position of said frame members to each other, and a plurality of wheels secured to said lower frame member.

5. In a stroller, an upper tubular frame member and a lower tubular frame member, each of said members having a plurality of slotted apertures and bolt apertures therein, a plurality of struts securing said upper tubular frame member to said lower tubular frame member, said struts having an upper tubular member and a lower tubular member, said upper tubular member having a flat end portion with an aperture therethrough perpendicular to the longitudinal axis of said upper tubular member, said lower tubular member having a flat end portion with an aperture therethrough perpendicular to the longitudinal axis of said lower tubular member, means to secure said upper and lower tubular members respectively to said upper and lower frame members, said means comprising a plurality of connecting members having arm portions and a body portion, said arm portions having aligned apertures therethrough, said body portion having a bolt member secured thereto and extending away from said arm portion apertures, said connecting members positioned with said arm apertures aligned with said respective flat end portion apertures of said upper tubular members and said lower tubular members, pin members extending through said arm portions and flat end portion aligned apertures and securing said connecting members respectively to said upper tubular members and said lower tubular members, said connecting members extending adjacent said respective slotted apertures in said upper and lower tubular frame members and said bolt members extending through said respective bolt apertures, a plurality of nuts threadedly secured on said bolt members securing said upper tubular members and said lower tubular members respectively to said upper tubular frame member and said lower tubular frame member, said upper tubular member positioned within said lower tubular member and slidable therein to permit said upper tubular member to telescope within said lower tubular member to collapse said stroller and lower said upper tubular frame member within the periphery of said lower tubular frame member, means to lock said stroller in an upright position, a seat member positioned parallel to and between said upper and lower tubular frame members and hingedly secured to each of said lower tubular members so that said seat member is maintained in substantially parallel relation to said frame members irrespective of the relative position of said frame members to each other, and a plurality of wheels secured to said lower frame member.

6. In a stroller, an upper tubular frame member and a lower tubular frame member, each of said members having a plurality of slotted apertures and bolt apertures therein, a plurality of struts securing said upper tubular frame member to said lower tubular frame member, said struts having an upper tubular member and a lower tubular member, said upper tubular member having a flat end portion with an aperture therethrough perpendicular to the longitudinal axis of said upper tubular member and having a locking aperture perpendicular to the longitudinal axis of said upper tubular member, said lower tubular member having a flat end portion with an aperture perpendicular to the longitudinal axis of said lower tubular member and having a locking aperture perpendicular to the longitudinal axis of said lower member, means to secure said upper and lower tubular members respectively to said upper and lower tubular frame members, said means comprising a plurality of connecting members having arm portions and a body portion, said arm portions having aligned apertures therethrough, said body portion having a bolt member secured thereto and extending away from said arm portion apertures, said connecting members positioned with said arm apertures aligned with said respective flat end portion apertures of said upper tubular members and said lower tubular members, pin members extending through said arm portions and flat end portions apertures and securing said connecting members respectively to said upper tubular members and said lower tubular members, said connecting members extending adjacent said respective slot apertures in said upper and lower tubular frame members and said bolt members extending through said respective bolt apertures, a plurality of nuts threadedly secured on said bolt members securing said upper tubular members and said lower tubular members respectively to said upper tubular frame member and said lower tubular frame member, said upper tubular member positioned within said lower tubular member and slidable therein to permit said upper tubular member to telescope within said lower tubular member to collapse said stroller and lower said upper tubular frame member within the periphery of said lower tubular frame member, means to lock said stroller in an upright position, said means comprising a pin member extending through said locking apertures in said upper tubular member and said lower tubular member, a J shaped resilient spring member, having parallel arm portions, positioned within the upper tubular member with said parallel arm portions parallel to said longitudinal axis of said upper tubular member, one of said arm portions being secured to the inner wall of said upper tubular member, said other arm portion being secured to said last mentioned pin member and exerting an outward resilient locking force thereto, a seat member positioned parallel to and between said upper and lower tubular frame members and hingedly secured to each of said lower tubular members so that said seat member is maintained in substantially parallel relation to said frame members irrespective of the relative position of said frame members to each other, and a plurality of wheels secured to said lower frame member.

7. In a stroller, an upper tubular frame member and a lower tubular frame member, each of said members having a plurality of slotted apertures and bolt apertures therein, a plurality of struts securing said upper tubular frame member to said lower tubular frame member, said struts having an upper tubular member and a lower tubular member, said upper tubular member having a flat end portion with an aperture perpendicular to the longitudinal axis of said upper tubular member and having a locking aperture substantially perpendicular to the longitudinal axis of said upper tubular member, said lower tubular member having a flat end portion with an aperture perpendicular to the longitudinal axis of said lower tubular member and having a locking aperture substantially perpendicular to the longitudinal axis of said lower member, means to secure said upper and lower tubular members respectively to said upper and lower tubular frame members, said means comprising a plurality of connecting members having arm portions and a body portion, said arm portions having aligned apertures therethrough, said body portion having a bolt member secured thereto and extending away from said arm portion apertures, said connecting members positioned with said arm apertures aligned with said respective flat end portion apertures of said upper tubular members and said lower tubular members, pin members extending through said arm portions and flat end portion apertures and securing said connecting members respectively to said upper tubular members and said lower tubular members, said connecting members extending through said respective slot apertures in said upper and lower tubular frame members and said bolt members extending adjacent said respective bolt apertures, a plurality of nuts threadedly secured on said bolt members securing said upper tubular members and said lower tubular members respectively to said upper tubular frame member and said lower tubular frame member, said upper tubular member positioned within said lower tubular member and slidable therein to permit said upper tubular member to telescope within said lower tubular member to collapse said stroller and lower said upper tubular frame member within the periphery of said lower tubular frame member, means to lock said stroller in an upright position, said means comprising a plurality of locking members each having a tubular portion and an arm portion extending from said tubular portion, said tubular portion being positioned over and secured to the outer wall of a lower tubular strut member, said arm portion having an aperture parallel to its longitudinal axis and opening into said tubular portion, said arm aperture being aligned with said locking apertures in said upper and lower strut members, a rod positioned in said arm aperture and extending through said locking apertures in said upper and lower tubular strut members, said rod having a rear portion of reduced diameter, a spring member positioned around said portion of reduced diameter of said rod, an annular plug member positioned in said arm portion aperture biasing said spring member against said rod member, means secured to said rod member operable to move said rod in a direction away from said tubular portion, said locking member arm portion having a slotted aperture therethrough, a seat member having a plurality of arm portions with apertures therethrough, said seat arm portion apertures aligned respectively with said locking member arm portion slotted apertures, bolt members extending through said last named aligned apertures and slidably securing said seat member to said strut members so that said seat member is maintained in substantially parallel relation to said frame members irrespective of the relative position of said frame members to each other, and a plurality of wheels secured to said lower frame member.

8. In a stroller, an upper tubular frame member and a lower tubular frame member, each of said members having a plurality of slotted apertures and bolt apertures therein, a plurality of struts securing said upper tubular frame member to said lower tubular frame member, said struts each having an upper member having a tubular portion and a closed end portion, said struts each having a lower member having a tubular portion and a closed end portion, means to secure said struts to said upper and lower tubular frame members, said upper strut member tubular portion positioned within said lower strut member tubular portion and slidable therein to permit said upper strut member to telescope within said lower strut member tubular portions to collapse said stroller and lower said upper tubular frame member within the periphery of said lower tubular frame member, a spring member positioned within said tubular portion of said upper member and said tubular portion of said lower member, an end portion of said spring member abutting said closed end portion of said upper member and the other end portion abutting said lower member closed end portion so that said upper member and lower member are biased away from each other, means to lock said stroller in a collapsed position and in an expanded position, seat supporting portions extending inwardly of certain of said strut members, a seat member slidably secured to said seat supporting portions and extending in parallel relation to and between said upper and lower frame members, said seat supporting portions arranged to maintain said seat member in substantially parallel relation to said frame members irrespective of the relative position of said frame members to each other, and a plurality of wheels secured to said lower frame member.

References Cited in the file of this patent

UNITED STATES PATENTS

| | | |
|---|---|---|
| 1,204,249 | Condon | Nov. 7, 1916 |
| 1,326,921 | Dzimitowicz | Jan. 6, 1920 |
| 1,342,518 | Webber | June 8, 1920 |
| 2,415,146 | Nanna | Feb. 4, 1947 |
| 2,509,103 | Lewis | May 23, 1950 |